(12) United States Patent
Cheon (10) Patent No.: US 8,078,877 B2
(45) Date of Patent: Dec. 13, 2011

(54) FAST BATCH VERIFICATION METHOD AND APPARATUS THERE-OF

(75) Inventor: Jung hee Cheon, Seoul (KR)

(73) Assignee: Seoul National University Industry Foundation (KR)

( * ) Notice: Subject to any disclaimer, the term of this patent is extended or adjusted under 35 U.S.C. 154(b) by 898 days.

(21) Appl. No.: 11/816,296

(22) PCT Filed: Mar. 31, 2006

(86) PCT No.: PCT/KR2006/001188
§ 371 (c)(1),
(2), (4) Date: Apr. 28, 2008

(87) PCT Pub. No.: WO2006/104362
PCT Pub. Date: Oct. 5, 2006

(65) Prior Publication Data
US 2009/0112956 A1    Apr. 30, 2009

(30) Foreign Application Priority Data

Mar. 31, 2005   (KR) .................... 10-2005-0027278

(51) Int. Cl.
*H04L 9/14* (2006.01)
(52) U.S. Cl. ........ 713/176; 713/177; 713/178; 713/179; 713/180; 380/28; 708/207
(58) Field of Classification Search .................. None
See application file for complete search history.

(56) References Cited

U.S. PATENT DOCUMENTS
5,347,581 A    9/1994  Naccache et al.
(Continued)

FOREIGN PATENT DOCUMENTS
JP    2002318634    10/2002

OTHER PUBLICATIONS

M. Bellare et al., "Fast Batch Verification for Modular Exponentiation and Digital Signatures," Jun. 1998, Proceedings of Eurocrypt '98, pp. 1-27.*

(Continued)

*Primary Examiner* — Taghi Arani
*Assistant Examiner* — Amir Mehrmanesh
(74) *Attorney, Agent, or Firm* — Cantor Colburn LLP (57) ABSTRACT

A fast batch verification method and apparatus are provided. In the method of batch-verifying a plurality of exponentiations, (a) a predetermined bit value t is set to an integer equal to or greater than 1; (b) a maximum Hamming weight k is set to an integer equal to or greater than 0 and less than or equal than the predetermined bit value t; (c) n verification exponents $s_i$ are randomly selected from a set of verification exponents S (n is an integer greater than 1, i is an integer such that $1 \leq i \leq n$), where the set of verification exponents S include elements whose bit values are less than or equal to the predetermined bit value t and to which a Hamming weight less than or equal to the maximum Hamming weight k is allocated; (d) a value of verification result is computed by a predetermined verification formula; and (e) the verification of the signatures is determined to be passed when the value of verification result satisfies a pre-determined pass condition. Accordingly, it is possible to significantly reduce the amount of computation and particularly, the computation amount of multiplication, without increasing a probability that a verification error would occur, thereby significantly improving the speed of verifying a plurality of signatures.

8 Claims, 4 Drawing Sheets

U.S. PATENT DOCUMENTS

| | | |
|---|---|---|
| 5,414,772 A | 5/1995 | Naccache et al. |
| 5,999,627 A | 12/1999 | Lee et al. |
| 2002/0041681 A1* | 4/2002 | Hoffstein et al. ............... 380/28 |
| 2002/0184504 A1* | 12/2002 | Hughes ......................... 713/177 |
| 2003/0046547 A1* | 3/2003 | Jakobsson et al. ............ 713/180 |
| 2005/0076223 A1* | 4/2005 | Chen et al. .................... 713/176 |
| 2005/0193048 A1* | 9/2005 | Vaudenay et al. ............ 708/400 |

OTHER PUBLICATIONS

International Search Report; PCT/KR2006/001188; Jun. 27, 2006.
Written Opinion of the International Searching Authority; PCT/KR2006/001188; Jun. 27, 2006.

* cited by examiner

| | $\ell$ | k | Prior art | Present invention |
|---|---|---|---|---|
| P-192 | 80 | 14 | (27n+64)A+272D | (14n+54)A+160D |
| P-224 | 112 | 21 | (37n+75)A+336D | (21n+74)A+224D |
| P-256 | 128 | 24 | (43n+85)A+384D | (24n+86)A+256D |
| P-384 | 192 | 35 | (64n+128)A+576D | (35n+128)A+384D |
| P-521 | 256 | 46 | (85n+174)A+777D | (46n+170)A+512D |
| B-163 | 80 | 15 | (27n+54)A+243D | (15n+54)A+160D |
| B-233 | 112 | 21 | (37n+74)A+345D | (21n+74)A+224D |
| B-283 | 128 | 23 | (43n+94)A+411D | (23n+86)A+256D |
| B-409 | 192 | 34 | (64n+136)A+601D | (34n+128)A+384D |
| B-571 | 256 | 44 | (85n+190)A+827D | (44n+170)A+512D |

Input : $(x_i, y_i)$ for $1 \leq i \leq n$.
Check : That $g^{x_i} = y_i$ for all $1 \leq i \leq n$.

1. Select n random elements $S_1, S_2, \ldots, S_n$ from S defined in equation (4)
2. $y \leftarrow 1$ and $y_0 \leftarrow g$.
3. $s_0 \leftarrow p - \sum_{i=1}^{n} s_i x_i \bmod q$.
4. For $j = 2\ell$ to 1, do
    (a) For i=0 to n, $y \leftarrow yy_i$ if the j-th bit of $s_i$ is one.
    (b) $y \leftarrow y^2$ unless $j=1$.
5. Accept if y is one, else reject.

US 8,078,877 B2

FAST BATCH VERIFICATION METHOD AND APPARATUS THERE-OF

TECHNICAL FIELD

The present invention relates to exponentiation and verification of a digital signature, and more particularly, to a fast batch verification method and apparatus for fast verifying a plurality of electronic signatures at a time

BACKGROUND ART

Advancement in technologies and an increase in electronic commercial transactions lead to frequent use of electronic signatures. As time goes by, use of electronic signatures, i.e., digital signatures, will be more accelerated. Use of an electronic signature must be accompanied with verification of the electronic signature. Meanwhile, some of servers or equipment need to make a verification of a large number of signatures at a time. For example, an electronic financial system of a bank is needed to efficiently verify a large number of certificates of authentication. Also, a vote protocol must be designed to fast verify a large amount of a voting result. Accordingly, an idea of batch verification has been introduced to expedite a signature verification.

Batch verification is an algorithm that verifies a plurality of signatures at a time. For batch verification, a method of verifying a large number of exponentiations at a time is mainly used. It is assumed that G is an abelian group having a generator g.

In batch verification, when a batch of n exponentiation pairs, e.g., $\{(x_1, y_1), (x_2, y_2), \ldots, (x_n, y_n)\}$, are given, it is determined whether all values i satisfy $$y_i = g^{x_i}$$

at a time (i is an integer from 1 to n). Here, $x_i$ denotes an element of Z (a natural number field), and $y_i$ denotes an element of the abelian group G. That is, $x_i \in Z$ and $y_i \in G$. In contrast, in general verification, not batch verification, whether each of the values i satisfy $$y_i = g^{x_i}$$

is individually verified.

Figure 1:
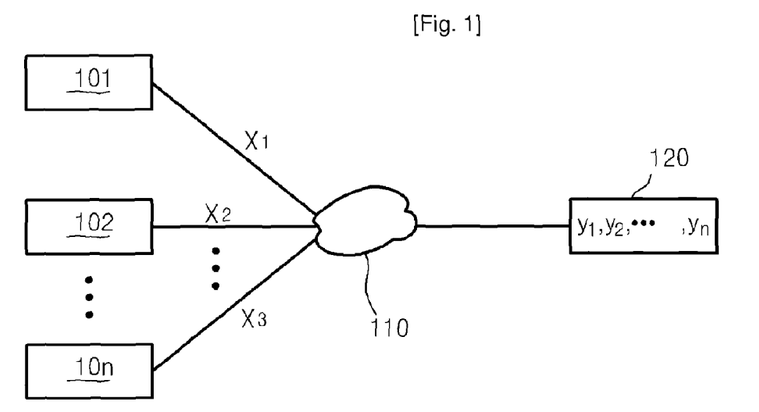
FIG. 1 is a block diagram illustrating a plurality of signing devices and a batch verification apparatus for explaining conventional batch verification.

FIG. 1 illustrates a plurality of signing devices 101, 102, ..., 10n and a batch verification apparatus 120 for explaining conventional batch verification. Referring to FIG. 1, the signing devices 101, 102, ..., 10n are connected to the batch verification apparatus 120 via a communication network 110. The batch verification apparatus 120 receives signature information that includes secret key information from each of the signing devices 101, 102, ..., 10n. The batch verification apparatus 120 may store public key information therein or receive it together with a signature. The batch verification apparatus 120 extracts a batch $\{(x_1, y_1), (x_2, y_2), \ldots, (x_n, y_n)\}$, for example, which are to be batch-verified based on the signature information and the public key information. Next, the batch verification apparatus 120 performs batch verification by checking whether all values i satisfy $$y_i = g^{x_i}$$

at the same time (i is an integer from 1 to n).

Accordingly, in batch verification, n exponentiation pairs are verified (batch-verified) in a batch by simultaneously checking whether they satisfy the equation given below, not by individually checking the n exponentiation pairs by checking whether $(x_1, y_1)$ satisfies $$y_1 = g^{x_1},$$

whether $(x_2, y_2)$ satisfies $$y_2 = g^{x_2},$$

and whether $(x_n, y_n)$ satisfies $$y_n = g^{x_n},$$

for example.

$$\prod_{i=1}^{n} y_i = g^{\sum_{i=1}^{n} x_i} \qquad \text{MathFigure 1}$$

An example of conventional batch verification is disclosed in U.S. Pat. No. 5,347,581 (hereinafter referred to as "'581 patent". In '581 patent, when $\{(x_1, y_1), (x_2, y_2), \ldots, (x_n, y_n)\}$ are given, whether they satisfy the equation given below is determined for batch verification thereof.

$$\prod_{i=1}^{n} y_i^{r_i} = g^{\sum_{i=1}^{n} x_i r_i} \qquad \text{MathFigure 2}$$

Equation (2) is obtained by raising the both sides of Equation (1) to power of $r_i$,
where $r_i$ denotes l-bit integers randomly selected when a security parameter l is given. That is, $$r_i \in \{0,1\}^l$$

where the integers $r_i$ are randomly selected from a set of l-bit numbers, each bit having a value of 0 or 1. That is, n $r_i(r_1, r_2, \ldots, r_n)$ are randomly selected from the set of numbers where a bit value is l and each bit is 0 or 1.

When the integers $r_i$ are selected from the set of l-bit integers being comprised of $\{0,1\}$, a probability that a verification error would occur is $1/2^l$. For example, the verification error indicates a case where at least one of the n pairs does not satisfy $$y_i = g^{x_i}$$

but Equation (2) is nevertheless satisfied thus allowing verification of all the n pairs to be passed.

According to '581 patent, the bit value l must be increased to reduce the probability that the verification error would occur. However, when the bit value l is increased, the computation amount of multiplication is increased to be proportional to the bit value l, thereby retarding the speed of verification.

Accordingly, it is highly desired to develop new high-speed batch verification with less amount of computation (particularly, computation amount of multiplication) than and with the same probability that the verification error would occur as batch verification disclosed in '581 patent, thereby improving the speed of verification.

DISCLOSURE OF INVENTION

Technical Problem

The present invention provides a method of performing batch verification at a high speed while reducing the amount of computation, thereby improving the speed of verification, an apparatus performing the method, and a recording medium having recorded thereon a computer program for executing the method.

Advantageous Effects

According to the present invention, it is possible to significantly reduce the amount of computation, and particularly, the amount of multiplication, without increasing a probability that a verification error would occur. Therefore, it is possible to significantly increase the speed of verifying a plurality of signatures.

BRIEF DESCRIPTION OF THE DRAWINGS

The above and other aspects and advantages of the present invention will become more apparent by describing in detail exemplary embodiments thereof with reference to the attached drawings in which.

BEST MODE FOR CARRYING OUT THE INVENTION

According to an aspect of the present invention, there is provided a method of batch-verifying a plurality of exponentiations when a set G and an element g belonging to the set G are given, the method including (a) setting a predetermined bit value t to an integer equal to or greater than 1; (b) setting a maximum Hamming weight k to an integer equal to or greater than 0 and less than or equal to the predetermined bit value t, that is, $1 \leq k \leq t$; (c) randomly selecting n verification exponents $s_i$ from a set of verification exponents S (n is an integer equal to 1, and i is such that $1 \leq i \leq n$), where the set of verification exponents S include elements whose bit values are less than or equal to the predetermined bit value t and to which a Hamming weight less than or equal to the maximum Hamming weight k is applied in an expansion of a number system; (d) computing a value of verification result by a predetermined verification formula to which the verification exponents are applied; and (e) checking whether the value of verification result satisfies a predetermined pass condition, and determining that the verification of the signatures is passed when the value of verification result satisfies the predetermined pass condition.

According to another aspect of the present invention, there is provided a recording medium having recorded thereon a computer program for executing the method.

According to another aspect of the present invention, there is provided an apparatus for verifying a plurality of signatures in a batch while reducing a probability that a verification error would occur to less than $1/2^l$ when a security parameter l is given, the apparatus including a setting unit which sets a predetermined bit value t to an integer equal to or greater than the security parameter l, and a maximum Hamming weight k to an integer equal to or greater than 0 and less than or equal to the predetermined bit value t, that is, $t \geq 1$, $0 \leq k \leq t$; a random number selector which randomly selects n verification exponents $s_i$ from a set of verification exponents S (n is an integer greater than 1, and i is an integer such that $1 \leq i \leq n$), where the set of verification exponents S include elements whose bit values are less than or equal to the predetermined bit value t and to which a Hamming weight less than or equal to the maximum Hamming weight k is applied; a verification result value computing unit which computes a value of verification result by a predetermined verification formula to which the verification exponents are applied; and a verification result determination unit which checks whether the value of verification result satisfies a predetermined pass condition and determines that the verification of the signatures is passed when the value of verification result satisfies the predetermined pass condition.

MODE FOR THE INVENTION

Hereinafter, exemplary embodiments of the present invention will be described in detail with reference to the accompanying drawings. Like reference numerals denote like elements throughout the drawings.

Before describing exemplary embodiments of the present invention with reference to the drawings, a general idea of batch verification according to the present invention will be briefly described. For better understanding of batch verification according to the present invention, the following notation will be used hereinafter. An abelian group (cyclic group) G having a generator g and an order q is assumed. That is, g and q denotes the generator and the order of the abelian group G, respectively.

In batch verification according to the present invention, when an object including n exponentiation pairs $\{(x_1, y_1), (x_2, y_2), \ldots, (x_n, y_n)\}$, which is to be batch-verified, is given, the n exponentiation pairs are verified simultaneously by determining whether they satisfy the equation given below (n is an integer equal to or greater than 2). Here, $x_i \in Z$ (a natural-number field) and $y_i \in G$.

$$\prod_{i=1}^{n} y_i^{s_i} = g^{\sum_{i=1}^{n} x_i s_i} \qquad \text{MathFigure 3}$$

Equation 3 may be obtained by multiplying the each side of a formula $$y_i = g^{x_i}$$

by power of $s_i$. Here, $s_i$ is determined to satisfy the equation given below when a security parameter l is given.

$$S_i \in S_{t,k}\{S \in \{0,1\}^t | 0 \leq wt(s) \leq k\} \qquad \text{MathFigure 4}$$

wherein $S_{t,k}$ denotes a set of verification exponents, wt(s) denotes a Hamming weight when an element s is represented in the binary system, and $s_i$ denotes an element randomly selected from the set of verification exponents $S_{t,k}$. t denotes a bit value that is an integer equal to or greater than 1 when each element is represented in the binary system. The bit value t is preferably an integer equal to or greater than security parameter l. k denotes a maximum Hamming weight to be applied to each element, that is, a maximum value of the Hamming weight wt(s).

Here, the Hamming weight wt(s) is defined as a digit number other than 0 in a binary expansion. However, the Hamming weight wt(s) may be defined as a digit number other than 0 in an expansion of another number system, such as a ternary expansion and signed binary representation.

The set of verification exponents $S_{t,w}$ is a set of elements s whose bit values are t or less and to which a weight from 0 to k is applied. That a weight is k means that a total number of specific bits of t-bits, e.g., 1's, is k and the other bits are 0's. The elements of the set of verification exponents $S_{t,w}$ are different modulo q.

To reduce a probability that an error would occur in batch verification according $$\frac{1}{|S|}$$

(i.e. $\frac{1}{2^l}$,) or less, the maximum Hamming weight k may be set to satisfy the equation given below.

$$|S| = \sum_{i=1}^{k} \binom{\lfloor \log q \rfloor}{i} \geq 2^l \qquad \text{MathFigure 5}$$

wherein q denotes an order of the abelian group G.

For

Figure 4:
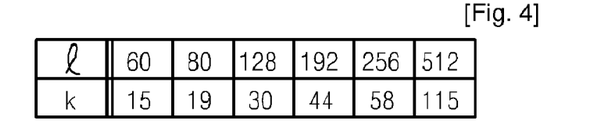
FIG. 4 is a table illustrating minimum values k satisfying Equation (5) for a security parameter l.

60≤l≤512 when $\lfloor \log q \rfloor = 2l$, minimum values k satisfying Equation (5) are listed in the table illustrated in FIG. 4.

Referring to FIG. 4, when l is 60, 80, 128, 192, 256, or 512, the minimum value k satisfying Equation (5) is 15, 19, 30, 44, 58, or 115. From the table of FIG. 4, the minimum value k is slightly less than l/4 when 60≤l≤512

Figure 2:
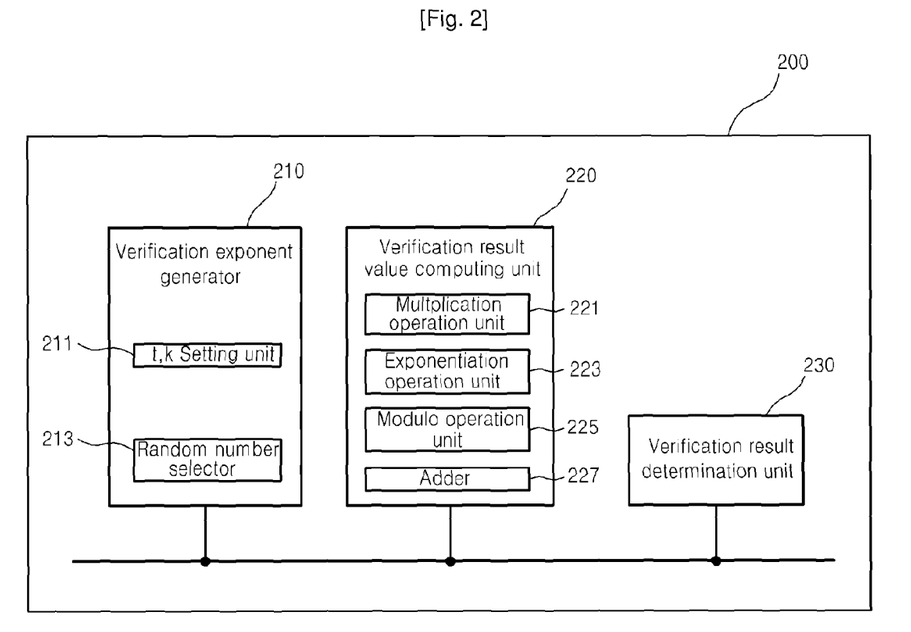
FIG. 2 is a block diagram of a batch verification apparatus according to an embodiment of the present invention.
Figure 3:
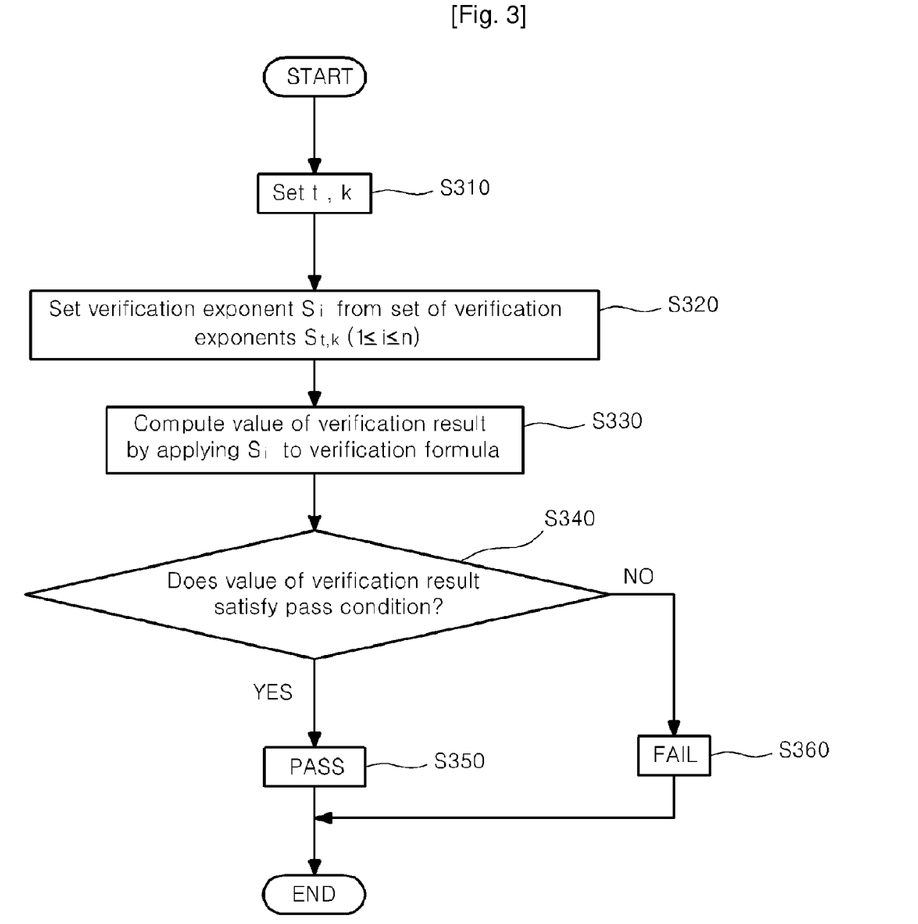
FIG. 3 is a flowchart illustrating a batch verification method according to an embodiment of the present invention.

FIG. 2 is a block diagram of a batch verification apparatus 200 according to an embodiment of the present invention. FIG. 3 is a batch verification method according to an embodiment of the present invention. The batch verification method illustrated in FIG. 3 may be performed by a batch verification apparatus according to an embodiment of the present invention. The batch verification apparatus 200 includes a verification exponent generator 210, a verification result value computing unit 220, and a verification result determination unit 230.

Referring to FIGS. 2 and 3, a batch verification method and apparatus according to an embodiment of the present invention will now be described.

It is assumed the following parameters are given.

First, (p, q, g) or (G, g, q) is given. Here, q denotes an order of an abelian group G, and g denotes a generator of the abelian group G or a random element, which is a base.

Second, n signatures, which are to be batch-verified, are given.

Third, a security parameter 1 is given.

If these parameters are given, a t,k setting unit 211 of the verification exponent generator 210 sets a bit value t of each element of the set of verification exponents $S_{t,k}$, and a maximum Hamming weight k (S310). In this case, t and k are determined to satisfy the equation given below.

t≥1, 0≤k≤t   MathFigure 6

Preferably, t is determined, and then, k is set to a minimum integer that satisfies the equation given below.

$$\sum_{i=1}^{k} \binom{t}{i} \geq 2^l \qquad \text{MathFigure 7}$$

When t and k are determined, a random number selector 213 of the verification exponent generator 210 randomly selects n verification exponents $S_i$ from the set of verification exponents $S_{t,k}$ (S320). That is, the verification exponents $S_i$ are randomly selected for i=1, 2, . . . , n.

The verification result value computing unit 220 computes the value of a verification result by applying the selected n verification exponents $S_i$ to a predetermined verification formula (S330). The predetermined formula may be Equation (3).

When Equation (3) is used as the verification formula, the value of verification result V is obtained by dividing the left-hand side of Equation (3) by the right-hand side thereof. That is, $$V = \frac{\prod_{i=1}^{n} y_i^{s_i}}{g^{\sum_{i=1}^{n} x_i s_i}}.$$

Specifically, to compute the value result of verification V, the verification result value computing unit 220 includes a multiplication operation unit 221 that performs multiplication, an exponentiation operation unit 223 that performs exponentiation, a modulo operation unit 225 that performs a modulo operation, and an adder 227.

The verification result determination unit 230 checks whether the value of verification result V computed by the verification result value computing unit 220 satisfies a predetermined pass condition (S340). If the value of verification result V satisfies the pass condition, it is determined that the verification is passed (S350). If not so, it is determined that the verification fails (S360).

The pass condition is set to 1 in Equation (3) which is the verification formula. That is, if V=1, the verification is passed, and if V≠1, the verification fails. If the verification is passed, all n signatures are allowed.

Figure 8:
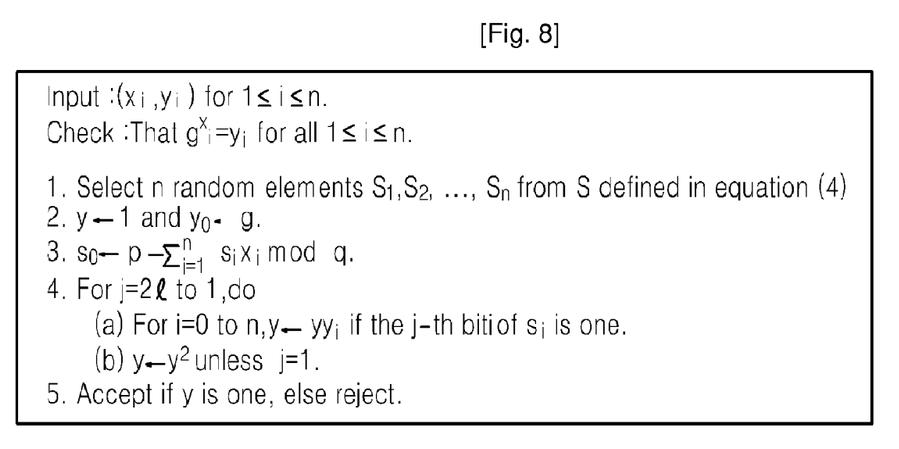
FIG. 8 is a diagram illustrating a binary method used in batch verification according to an embodiment of the present invention.

For more efficient verification, simultaneous multiplication is preferably performed. In detail, when computing the value of verification result $$V = \frac{\prod_{i=1}^{n} y_i^{s_i}}{g^{\sum_{i=1}^{n} x_i s_i}}$$

in operation S330, a binary method as illustrated in FIG. 8 is preferably used.

Specifically, referring to FIG. 8, in the binary method, n random elements $s_1, s_2, \ldots, s_n$ are selected from the set of verification exponent $S_{t,k}$ defined in Equation (4), and 1 and g are substituted for y and $y_0$, respectively. Next, $$p - \sum_{i=1}^{n} s_i x_i \bmod q$$

is computed and the result is substituted for $s_0$.

Next, operations (a) and (b) are performed for j from 2l to 1. Here, in operation (a), if the $j^{th}$ bit of $s_i$ is 1, $y*y_i$ is substituted for y (i from 0 to n), and in operation (b), if j≠1, $y^2$ is substituted for y.

Lastly, if y=1, the verification is determined to be passed, and unless y=1, the verification is determined to fail.

Figure 5:
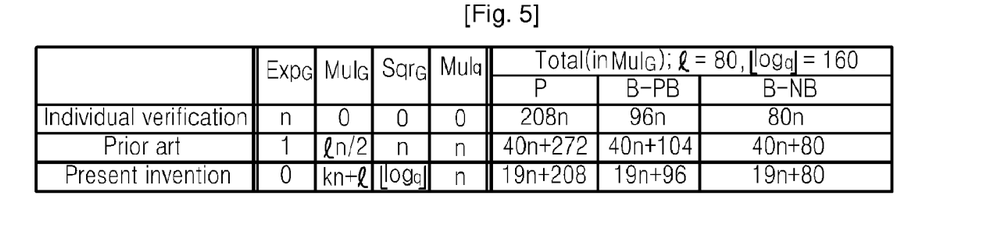
FIG. 5 is a table illustrating average numbers of operations performed in individual verification, conventional batch verification disclosed in '581 patent, and batch verification according to the present invention.

FIG. 5 is a table illustrating average numbers of operations performed in individual verification, conventional batch verification disclosed in '581 patent, and batch verification according to the present invention. In detail, FIG. 5 illustrates a case where n signatures are given and $$\lfloor \log q \rfloor = 2l$$

In individual verification, n signatures are individually verified.

Referring to FIG. 5, $Exp_G$, $Mul_G$, $Sqr_G$, and $Mul_q$ respectively denote total numbers of exponentiation operations, multiplication operations, squaring operations, and modular multiplication operations for an abelian group G.

Compared to conventional batch verification, in batch verification according to the present invention, an exponentiation for the abelian group G is canceled, the number of squaring operations for the abelian group G is very slightly increased (which is not related to n), but the number of multiplication operations for the abelian group G is reduced. Furthermore, the squaring operations are more efficient than the multiplication operations. As described above, from the table of FIG. 4, k≦l/4. Accordingly, the number of the multiplication operations for the abelian group G in batch verification according to the present invention is ½ times less than in conventional batch verification. Thus, when n is increased, the speed of batch verification according to the present invention is two or more times faster than that of conventional batch verification.

Referring to FIG. 5, when l=80 and $$\lfloor \log q \rfloor$$

=160, total numbers of multiplication operations $Mul_G$ for the abelian group G required in batch verification according to the present invention and conventional batch verification will be described. In the case of a prime-number field P, conventional batch verification needs multiplication to be performed 40n+272 times, whereas batch verification according to the present invention needs multiplication to be performed 19n+208 times. In the case of a binary field B-PB having a polynomial basis, conventional batch verification requires multiplication to be performed 40n+104 times, but batch verification according to the present invention requires multiplication to be performed 19n+96 times. In the case of a field P-NB having a normal basis, conventional batch verification requires multiplication to be performed 40n+80 times, but batch verification according to the present invention requires multiplication to be performed 19n+80 times.

If $$\lfloor \log q \rfloor \geq 2l,$$

the performance (computing speed) of verification according to the present invention is more improved.

Figure 6:
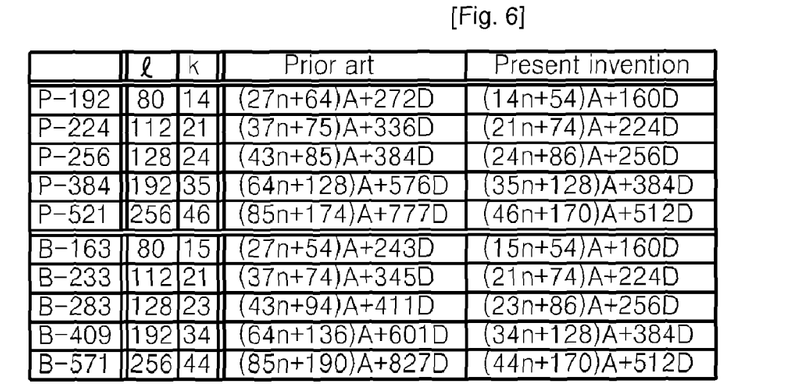
FIG. 6 is a table illustrating the performances of conventional batch verification disclosed in '581 patent, and batch verification according to the present invention.

FIG. 6 is a table illustrating the performances of conventional batch verification disclosed in '581 patent and batch verification according to the present invention. In detail, FIG. 6 is a table illustrating a comparison of batch verification according to the present invention with conventional batch verification disclosed in '581 patent with respect to elliptic curves proposed by the US National Institute of Standards and Technology (NIST).

In FIG. 6, A denotes addition and D denotes doubling. Referring to FIG. 6, as n becomes increased, the speed of batch verification according to the present invention is 1.8 times faster than that of conventional batch verification The above batch verification according to the present invention is applicable to various types of digital signature schemes known so far.

Figure 7:
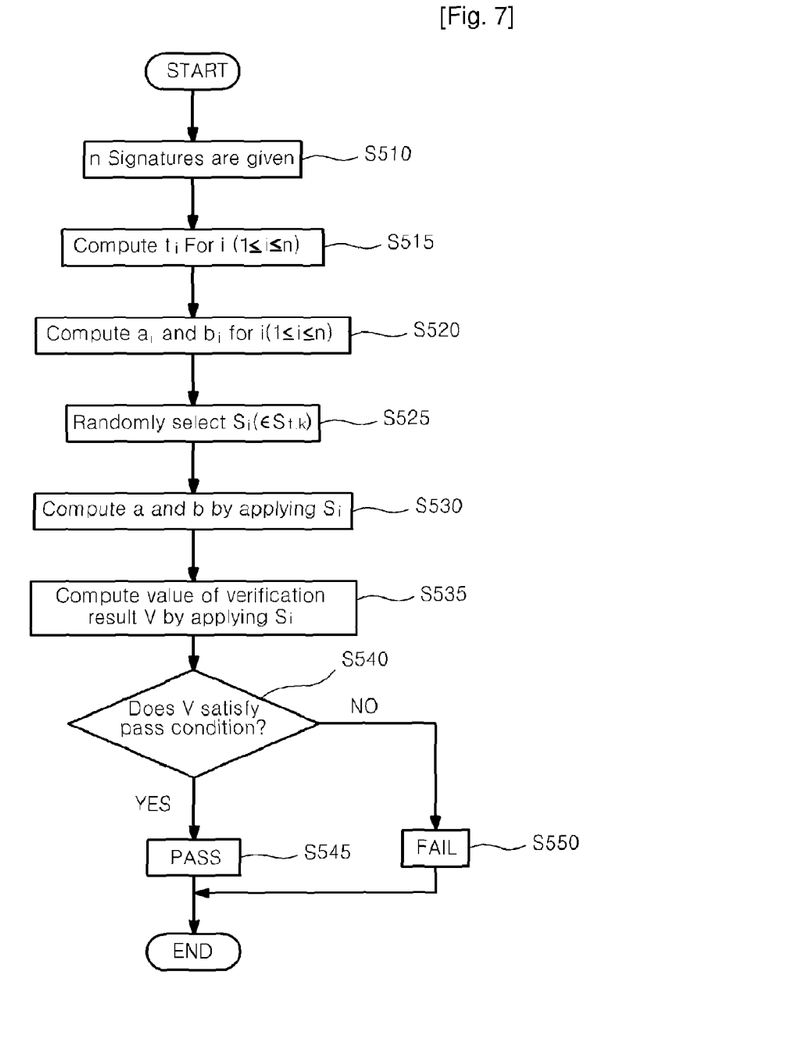
FIG. 7 is a flowchart illustrating a verification process when batch verification according to the present invention is applied to a modified Digital Signature Algorithm (DSA).

FIG. 7 is a flowchart illustrating a verification process when batch verification according to the present invention is applied to a modified Digital Signature Algorithm (DSA).

DSA parameters are as follows.

First, it is assumed that a security parameter l is 80, i.e., l=80.

It is assumed that p is a 1024-bit prime number, and q is a 160-bit prime number by which p-1 is divided. Also, it is assumed that (p-½q) does not have a divisor less than q. Further, it is assumed that g is a generator of a subgroup G that has an order q within F(Z/p). Here, $F_P(Z/p)$ denotes a finite field having p elements. Thus, the subgroup G is a set of orders q, e.g., $\{1, g, \ldots, g^{q-1}\}$, which are generated based on the generator g.

An element x of Z/q is randomly selected, that is, x∈Z/q. Here, x denotes a private key, and a public key y corresponding to the private key x is $g^x$.

A signature for a given message m for a random number k belonging to Z/q is (r=$g^k$ mod p, σ=$k^{-1}$(m+xr) mod q), where m∈Z/q, k∈Z/q. The signature is verified by determining whether it satisfies the equation given below:

$$r = \pm g^a y^b \bmod p, \text{ for } a = m\sigma^{-1} \bmod q \text{ and } b = r\sigma^{-1} \bmod q \quad \text{MathFigure 8}$$

When n signatures $(m_i, r_i, \sigma_i)$ are given, batch verification thereof will now be described with reference to FIG. 7, where 1≦i≦n.

When a plurality of signatures (here, n signatures) are given (S510), $t_i$ for i is computed (1≦i≦n) (S515). Here, $$t_i = \sigma^{-1}.$$

Next, $a_i$ and $b_i$ for i are computed (S520). Here, $$a_i = m_i t_i \bmod q, b_i = r_i t_i.$$

Next, a verification exponent $s_i$ is randomly selected from elements belonging to a set of verification exponents $S_{t,k}$ (S525). In this case, the verification exponent $s_i$ is randomly selected from the set of verification exponents $S_{t,k}$ satisfying Equation (4) (S525).

Next, a and b are compute by applying the verification exponent $s_i$ (S530). Here, $$a = -\sum_{i=1}^{n} a_i s_i \bmod q, \quad b = -\sum_{i=1}^{n} b_i s_i.$$

Next, the value of verification result $$V = g^a y^b \prod_{i=1}^{n} r_i^{s_i} \bmod p$$

is computed by applying the verification exponent $s_i$ (S535).

Lastly, it is checked whether the value of verification result V satisfies a predetermined pass condition (S540), and it is determined that the verification is passed when the value of verification result V satisfies the pass condition (S545). If the value of verification result V does not satisfy the predetermined pass condition, it is determined that the verification fails (S550). Here, the predetermined pass condition is 1 or p−1.

Thus, it is determined whether the value of verification result V is 1 or p−1. When v=1 or p−1, the verification is passed and all the n signatures are allowed. If V is neither 1 nor p−1, the verification fails.

The verification process of FIG. 7 includes two types of operations. A first type of operations are modulo q operations being comprised of 4n modulo g multiplications and n modulo q inversions. A second type of operations are modulo p operations being comprised of 160+19n modulo p multiplications and 321 modulo p squaring operations on the average, and 320+19n modulo p multiplications and 321 modulo p squaring operations at maximum. The computation amount of the first type operations (modulo q operations) is equal to that in conventional batch verification disclosed in '581 patent, but the computation amount of the second type operations (modulo p operations) becomes approximates a half that in conventional batch verification disclosed in '581 patent as n becomes increased.

FIG. 7 is a flowchart illustrating a verification process when batch verification according to the present invention is applied to a modified Elliptic Curve Digital Signature Algorithm (ECDSA).

The ECDSA is an elliptic curve analogue of the DSA. Batch verification according to the present invention is not applied to the original ECDSA as it is not applied to the original DSA. Thus, ECDSA is slightly modified for batch verification.

It is assumed that E denotes an elliptic curve, and an order q of the elliptic curve E is also a prime number and $G(\in E)$ is a generator. Also, it is assumed that a secret key is x and a corresponding public key Q=xG.

A signature for a given message m is (R=kG, $\sigma = k^{-1}(m+xr) \bmod q$), where $m \in Z_q$. Here, for a random number $k(\in Z_q)$, R=(x1, y1) and r=x1 mod q. The signature is verified by determining whether it satisfies the equation given below.

$$R = \alpha G + bQ, \text{ for } \alpha = m\sigma^{-1} \bmod q \text{ and } b = r\sigma^{-1} \bmod q \qquad \text{MathFigure 9}$$

When n signatures $(m_i, r_i, \sigma_i)$ are given, batch verification thereof will now be described with reference to FIGS. 5 and 7 ($1 \leq i \leq n$).

When n signatures $(m_i, r_i, \sigma_i)$ for $1 \leq i \leq n$ are given (S510), $t_i$ for i is computed (S515). Here, $$t_i = \sigma^{-1} \bmod q.$$

Next, for i, $a_i$ and $b_i$ are computed (S520). Here, $$a = -\sum_{i=1}^{n} a_i s_i \bmod q,$$

$$b = -\sum_{i=1}^{n} b_i s_i \bmod q.$$

Next, a verification exponent $s_i$ is randomly selected from elements belonging to a set of verification exponents $S_{t,k}$ (S525). In this case, the verification exponent $s_i$ is randomly selected from the set of the verification exponent $S_{t,k}$ satisfying Equation (4).

Next, a and b are computed by applying the verification exponent $s_i$ (S530). Here, $$a = -\sum_{i=1}^{n} a_i s_i \bmod q,$$

$$b = -\sum_{i=1}^{n} b_i s_i \bmod q.$$

Next, the value of verification result $$V = aG + bQ + \sum_{i=1}^{n} s_i R_i$$

is computed by applying the verification exponent $s_i$ (S535).

Lastly, it is determined whether the value of verification result V satisfies a pre-determined pass condition (S540). If the value of verification result V satisfies the pre-determined pass condition, it is determined that the verification is passed (S545). If the value of verification result V does not satisfy the predetermined pass condition, it is determined that the verification fails (S550). Here, if V is a point on infinity O, all of the n signatures are allowed.

A verification process when batch verification according to the present invention is applied to a modified Guillou-Quisquater (GQ) signature scheme, is as follows.

To apply batch verification according to the present invention to the GQ signatures, the scheme according to the present invention is needed to be slightly modified as when applied to a DSA scheme.

It is assumed that N is a product of two prime numbers $p_1$ and $p_2$, and e is an 160-bit integer. A random number J is selected, and $$\alpha = J^{-e^{-1}} \bmod N$$

is computed. In this case, public keys are N, J, and e, and secret keys are $p_1$, $p_2$, and a.

A signature for a given message m is (r=$k^e$ mod N, $\sigma = k^{-1}(k a^h \bmod N)$) for a random number k belonging to $Z_N$ and h that are hash outputs of m and r, where $m \in Z_N$ and $k \in Z_N$. The signature is verified by determining whether it satisfies the equation given below.

$$\sigma^e J^h r \bmod N \qquad \text{MathFigure 10}$$

When n signatures $(m_i, r_i, \sigma_i)$ are given, batch verification thereof will be described ($1 \leq i \leq n$).

When a plurality of signatures (here, n signatures) are given ($1 \leq i \leq n$), n random numbers $s_i$ are selected from elements belonging to a set of verification exponents $S_{t,k}$, and values of verification result V1 and V2 are computed by:

$$V1 = \left(\prod_{i=1}^{n} \sigma_i^{s_i}\right)^e J^{\sum_{i=1}^{n} s_i h_i}, \quad V2 = \prod_{i=1}^{n} r_i^{s_i}$$

If the values of verification result V1 and V2 are the same with respect to modulo N, the verification is passed, and if not, the verification fails.

The verification needs multiplication to be performed $$\frac{(t+160)\lfloor \log n \rfloor}{2} + 2kn + 80$$

times and squaring $$(t+160)\lfloor \log n \rfloor + 2t + 160$$

times on the average.

Batch verification according to the present invention is also applicable to a Rivest-Shamir-Adleman (RSA) signature scheme.

It is assumed that N is a product of two different prime numbers $p_1$ and $p_2$. Here, $p_1 = 2p_1' + 1$ and $p_2 = 2p_2' + 1$. Also, it is assumed ed is 1 mod N.

A signature for a given message m is
$\sigma = m^d$ mod N, where $m \in Z_N$. Conventionally, verification of the signature is performed by determining whether
$\sigma^e = m$ mod N. To apply batch verification according to the present invention to the RSA signature scheme, the scheme of the present invention is needed to be slightly modified as when being applied to the DSA. For example, if
$\sigma 4^{e=m4}$ mod N, $(\sigma, m)$ is determined to be a valid signature.

When n signatures $(m_i, \sigma_i)$ are given ($1 \leq i \leq n$), n random elements s are selected from elements belonging to a set of verification exponents $S_{t,k}$, and the values of verification result V1 and V2 are computed by:

$$V1 = \left(\prod_{i=1}^{n} \sigma_i^{s_i}\right)^e, \quad V2 = \prod_{i=1}^{n} m_i^{s_i}$$

If the values of verification result V1 and V2 are the same with respect to modulo N, the verification is passed, and if not, the verification fails.

The verification needs multiplication to be performed 2kn+ wt(e) times and squaring to be performed 2L times on the average. Thus, if a verification exponent e is 3 or $2^{16}+1$, the performance of a verification scheme according to the present invention is worse than that of conventional verification of an RSA signature. Accordingly, when an exponent is significantly greater than 3 and $2^{16}+1$ and simultaneous verification of a lot of signatures is needed, batch verification according to the present invention is more effective than conventional batch verification.

While this invention has been particularly shown and described with reference to preferred embodiments thereof, it will be understood by those skilled in the art that various changes in form and details may be made therein without departing from the spirit and scope of the invention as defined by the appended claims.

INDUSTRIAL APPLICABILITY

As described above, the present invention is applicable to improving the speed of a batch verification method and apparatus.

The invention claimed is:

1. A method for fast verifying a plurality of electronic signatures by batch-verifying a plurality of exponentiations when a set G and an element g belonging to the set G are given, the method comprising a processor performing the steps of:
    (a) setting a predetermined bit number t to an integer equal to or greater than 1;
    (b) setting a maximum Hamming weight k to is an integer equal to or greater than 0 and less than or equal to the predetermined bit number t, that, $0 \leq k \leq t$;
    (c) randomly selecting n verification exponents $S_i$ from a set of verification exponents S, where i is an integer such that $1 \leq i \leq n$, and the set of verification exponents S comprise elements whose bit values are less than or equal to the pre-determined bit value t and to which a Hamming weight less than or equal to the maximum Hamming weight k is allocated in an expansion of a number system, where n is a natural number;
    (d) computing a value of verification result by a predetermined verification formula to which the verification exponents are applied; and
    (e) checking whether the value of verification result satisfies a predetermined pass condition, and determining that the verification of the signatures is passed when the value of verification result satisfies the predetermined pass condition, wherein in (d), the predetermined verification formula comprises:

$$\prod_{i=1}^{n} y_i^{s_i} = g^{\sum_{i=1}^{n} x_i s_i}$$

wherein $x_i \in Z$, $y_i \in G$, and Z denotes a natural number field.

2. The method of claim 1, wherein the set G is a subgroup of a finite field Fp having p elements and an order q, where p is a prime number.

3. The method of claim 1, wherein the set G is a subset of an abelian group Z/n for a natural number n.

4. The method of claim 1, wherein the set G is an elliptic curve group having an order q.

5. The method of claim 1, wherein (a) comprises setting the predetermined bit value t to be equal to or greater than a security parameter 1.

6. The method of claim 1, wherein each element belonging to the set of verification exponents S has a non-adjacent form in signed binary representation, and each digit value of each element is one of 0, 1, and −1.

7. A method for fast verifying a plurality of electronic signatures by batch-verifying a plurality of exponentiations when a set G and an element g belonging to the set G are given, the method comprising a processor performing the steps of:
    (a) setting a predetermined bit number t to an integer equal to or greater than 1;
    (b) setting a maximum Hamming weight k to an integer equal to or greater than 0 and less than or equal to the predetermined bit number t, that is, $0 \leq k \leq t$;
    (c) randomly selecting n verification exponents $S_i$ from a set of verification exponents S, where i is an integer such that $1 \leq i \leq n$, and the set of verification exponents S comprise elements whose bit values are less than or equal to the pre-determined bit value t and to which a Hamming weight less than or equal to the maximum Hamming weight k is allocated in an expansion of a number system, where n is a natural number;

(d) computing a value of verification result by a predetermined verification formula to which the verification exponents are applied; and (e) checking whether the value of verification result satisfies a predetermined pass condition, and determining that the verification of the signatures is passed when the value of verification result satisfies the predetermined pass condition, wherein (a) comprises setting the predetermined bit value t to be equal to or greater than a security parameter l wherein (b) comprises setting the maximum Hamming weight k to a minimum integer satisfying:

$$\sum_{i=1}^{k} \binom{t}{i} \geq 2^l.$$

8. A non-transitory recording medium having recorded thereon a program for executing the method of any one of claims 1 through 6 in a digital signal processor.

* * * * *